US009567913B2

(12) United States Patent
Ekanayake et al.

(10) Patent No.: US 9,567,913 B2
(45) Date of Patent: Feb. 14, 2017

(54) SYSTEMS AND METHODS TO EXTEND GAS TURBINE HOT GAS PATH PARTS WITH SUPERCHARGED AIR FLOW BYPASS

(71) Applicant: General Electric Company, Schenectady, NY (US)

(72) Inventors: Sanji Ekanayake, Mableton, GA (US); Alston Ilford Scipio, Mableton, GA (US); Steven Hartman, Marietta, GA (US); Dale J. Davis, Greenville, SC (US)

(73) Assignee: General Electric Company, Schenectady, NY (US)

( * ) Notice: Subject to any disclaimer, the term of this patent is extended or adjusted under 35 U.S.C. 154(b) by 736 days.

(21) Appl. No.: 13/751,603

(22) Filed: Jan. 28, 2013

(65) Prior Publication Data
US 2014/0208765 A1 Jul. 31, 2014

(51) Int. Cl.
*F02C 9/16* (2006.01)
*F02C 9/28* (2006.01)
(Continued)

(52) U.S. Cl.
CPC . *F02C 9/16* (2013.01); *F02C 6/08* (2013.01); *F02C 6/18* (2013.01); *F02C 9/18* (2013.01); *F02C 9/28* (2013.01); *F05D 2220/70* (2013.01); *F05D 2270/112* (2013.01); *F05D 2270/303* (2013.01); *F05D 2270/3061* (2013.01); *F05D 2270/331* (2013.01); *Y02E 20/14* (2013.01)

(58) Field of Classification Search
CPC ................. F02C 6/08; F02C 6/18; F02C 9/16; F02C 9/18; F02C 9/28

USPC .............................................. 60/39.182, 39.5
See application file for complete search history.

(56) References Cited

U.S. PATENT DOCUMENTS 3,796,045 A * 3/1974 Foster-Pegg ............ F01K 23/10
60/39.182
6,003,298 A 12/1999 Horner
(Continued)

FOREIGN PATENT DOCUMENTS

CN 102733870 A 10/2012
EP 1245805 A2 10/2002
(Continued)

OTHER PUBLICATIONS

CN office action dated May 27, 2016 that corresponds with CN Application No. 201410041561.6.
(Continued)

*Primary Examiner* — Phutthiwat Wongwian
*Assistant Examiner* — Thuyhang Nguyen
(74) *Attorney, Agent, or Firm* — Ernest G. Cusick; Frank A. Landgraff

(57) ABSTRACT

A system and method for supercharging a combined cycle system includes a forced draft fan providing a variable air flow. At least a first portion of the air flow is directed to a compressor and a second portion of the airflow is diverted to a heat recovery steam generator. A control system controls the airflows provided to the compressor and the heat recovery steam generator. The system allows a combined cycle system to be operated at a desired operating state, balancing cycle efficiency and component life, by controlling the flow of air from the forced draft fan to the compressor and the heat recovery steam generator.

18 Claims, 20 Drawing Sheets

(51) Int. Cl.
*F02C 6/08* (2006.01)
*F02C 6/18* (2006.01)
*F02C 9/18* (2006.01)

(56) References Cited

U.S. PATENT DOCUMENTS

| | | | |
|---|---|---|---|
| 6,308,512 | B1 | 10/2001 | Kopko |
| 6,442,942 | B1 * | 9/2002 | Kopko ............... F02C 3/36 60/726 |
| 6,442,949 | B1 | 9/2002 | Laskaris et al. |
| 6,494,045 | B2 * | 12/2002 | Rollins, III .......... F01K 23/105 60/39.281 |
| 6,530,224 | B1 | 3/2003 | Conchieri |
| 6,606,848 | B1 | 8/2003 | Rollins, III |
| 6,718,771 | B1 | 4/2004 | Kopko |
| 6,880,343 | B2 | 4/2005 | Kopko |
| 7,065,953 | B1 | 6/2006 | Kopko |
| 7,124,591 | B2 * | 10/2006 | Baer ................ F02C 7/12 60/782 |
| 2003/0182944 | A1 * | 10/2003 | Hoffman ............ F01K 23/10 60/772 |
| 2011/0289899 | A1 | 12/2011 | De La Cruz Garcia et al. |
| 2012/0260668 | A1 | 10/2012 | Rogers et al. |

FOREIGN PATENT DOCUMENTS

| | | |
|---|---|---|
| JP | 2007315213 A | 12/2007 |
| JP | 4898294 B2 | 3/2012 |

OTHER PUBLICATIONS

U.S. Appl. No. 13/485,216, filed May 31, 2012, Conchieri.
U.S. Appl. No. 13/485,273, filed May 31, 2012, Ekanayake.
U.S. Appl. No. 13/721,870, filed Dec. 20, 2012, Ekanayake.
U.S. Appl. No. 13/721,946, filed Dec. 20, 2012, Ekanayake.
U.S. Appl. No. 13/485,160, filed May 31, 2012, Ekanayake.
Brandon et al, "Inlet Air Supercharging of a 70 kW Microturbine" Proceedings of GT2006 ASME Turbo Expo 2006: Power for Land, Sea and Air May 8-11, 2006, Barcelona, Spain.
Enhanced Turbine Output LLC, 3000 connecticut Ave, suite 317, Washington DC 20008, "Summary Description of Powercool", www.etollc.com, May 20, 2004, p. 1-2.
Howden Brochure, "Variax Axial Flow Fans continually setting new standards", Howden Denmark *NS*, Industrivej 23, DK-4700 Naestved, Denmark, 2009, pp. 1-7, www.howden.com.
Voith Turbo, Voith Turbo GmbH & Co. KG, Jul. 12, 2002, pp. 1-20, www.Voithturbo.com.
Wang, T. and Braquet, L., "Assessment of Inlet cooling to enhance output of a fleet of gas turbines", Proceedings of the Thirtieth Industrial Energy Technology Conference, IETC 30[1] New Orleans, May 6-9, 2008.

\* cited by examiner

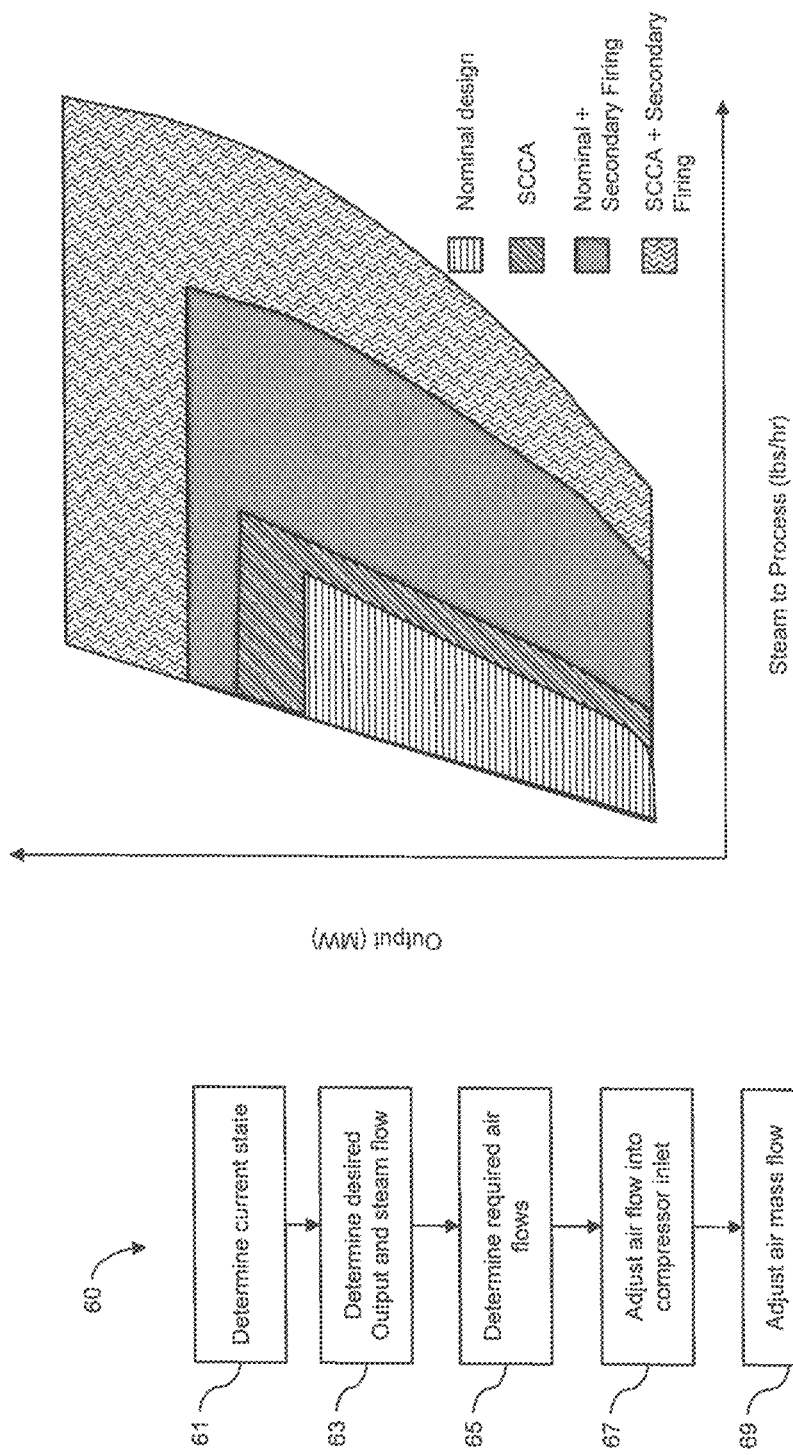

| Prime Mover | Capital cost | Sub-system complexity | Maintenance cost | Cycle efficiency | Peak output at a fixed super-charger boost |
|---|---|---|---|---|---|
| Variable-Frequency-Drive Motor | Medium | Low | Low | Medium | Low |
| Induction Motor | Low | Low | Low | Low | Low |
| Steam Turbine | Medium | High | Medium | Medium | Medium |
| HD Gas Turbine | High | Medium | High | High | Very high |
| Aero Gas Turbine | High | Medium | Very high | Very high | Very high |
| Reciprocating Gas Engine | Medium | Medium | Medium | High | Very high |

*Fig. 16*

SYSTEMS AND METHODS TO EXTEND GAS TURBINE HOT GAS PATH PARTS WITH SUPERCHARGED AIR FLOW BYPASS

CROSS-REFERENCE TO RELATED APPLICATIONS

This application is related to application Ser. No. 13/485,216, titled GAS TURBINE COMPRESSOR INLET PRESSURIZATION AND FLOW CONTROL SYSTEM, filed jointly in the names of John Anthony Conchieri, Robert Thomas Thatcher, and Andrew Mitchell Rodwell and application Ser. No. 13/485,273, titled GAS TURBINE COMPRESSOR INLET PRESSURIZATION HAVING A TORQUE CONVERTER SYSTEM, filed jointly in the names of Sanji Ekanayake and Alston I. Scipio, each assigned to General Electric Company, the assignee of the present invention.

TECHNICAL FIELD

The subject matter disclosed herein relates to combined cycle power systems and more particularly to supercharged combined cycle systems with air flow bypass.

BACKGROUND

Combined cycle power systems and cogeneration facilities utilize gas turbines to generate power. These gas turbines typically generate high temperature exhaust gases that are conveyed into a heat recovery steam generator (HRSG) that produces steam. The steam may be used to drive a steam turbine to generate more power and/or to provide steam for use in other processes.

Operating power systems at maximum efficiency is a high priority for any generation facility. Factors including load conditions, equipment degradation, and ambient conditions may cause the generation unit to operate under less than optimal conditions. Supercharging (causing the inlet pressure to exceed the ambient pressure) turbine systems as a way to increase the capacity of gas-turbine is known. Supercharged turbine systems typically include a variable speed supercharging fan located at the gas turbine inlet that is driven by steam energy derived from converting exhaust waste heat into steam. The supercharging fan is used to increase the air mass flow rate into the gas turbine so that the gas turbine shaft horsepower can be augmented.

Additional high priorities for operators of generation facilities are maintenance costs and availability. One component of maintenance costs is equipment life. There are many factors that influence equipment life, among them are the type of fuel used, the operating hours at base load, the operating hours at peak load, and water steam injection into the compressor airflow. These factors influence the life of hot gas path parts. Increased temperatures in the turbine may have an impact on the lifetime of the components positioned along the hot gas path and elsewhere. Typically, operations above base load will reduce the lifetime of the hot gas path components while operations below base load generally will extend component lifetime. Under some conditions an operator may be willing to sacrifice efficiency for extended life of hot gas path parts in order to lessen maintenance costs. However, conventional combined cycle systems do not provide an adequate level of control of hot gas path parts life.

BRIEF DESCRIPTION OF THE INVENTION

In accordance with one exemplary non-limiting embodiment, the invention relates to a method for extending life of hot gas path parts of a turbine system. The method includes the steps of determining a desired load; determining a nominal firing temperature for the desired load; and determining a supercharged firing temperature for the desired load. The method further includes the steps of determining a first mass flow quantity of air to be provided to a compressor in the turbine system to achieve the supercharged firing temperature for the desired load; providing an air flow; and conveying the first mass flow quantity of air into the compressor.

In another embodiment, the invention relates to a method for extending hot gas path parts life in a turbine system. The method includes the steps of determining a desired load; determining an efficiency trade off; and determining a desired maintenance factor. The method further includes the steps of determining an amount of supercharging required to achieve the desired maintenance factor for the desired load. The method includes determining a first mass flow quantity of air to be provided to a compressor to achieve the amount of supercharging; and determining a second mass flow quantity of air to be provided to a heat recovery steam generator. The method further includes the steps of providing an air flow; conveying the first mass flow quantity of air into the compressor; and conveying the second mass flow quantity of air to the heat recovery steam generator.

In another embodiment, the invention relates to a method for ramping up a combined cycle system having a gas turbine and a heat recovery steam generator. The method includes the steps of determining a desired load; determining a present load; and determining whether the desired load is greater than the present load. The method further includes the steps of determining an incremental load increase; and determining a desired firing temperature for the present load plus the incremental load increase. The method further includes the steps of calculating a first supercharged mass flow to the gas turbine to achieve the desired firing temperature for the present load plus the incremental load increase; increasing the load to the present load plus the incremental load increase; and providing the first supercharged mass flow to the gas turbine.

BRIEF DESCRIPTION OF THE DRAWINGS

Other features and advantages of the present invention will be apparent from the following more detailed description of the preferred embodiment, taken in conjunction with the accompanying drawings which illustrate, by way of example, the principles of certain aspects of the invention.

FIG. 5 is a flow chart of an embodiment of a method implemented by a supercharged combined cycle system with air bypass.

FIG. 6 is a chart illustrating a result accomplished by a supercharged combined cycle system with air bypass.

FIG. 16 is a table summarizing the advantages and disadvantages of different prime movers.

DETAILED DESCRIPTION OF THE INVENTION

Figure 1:
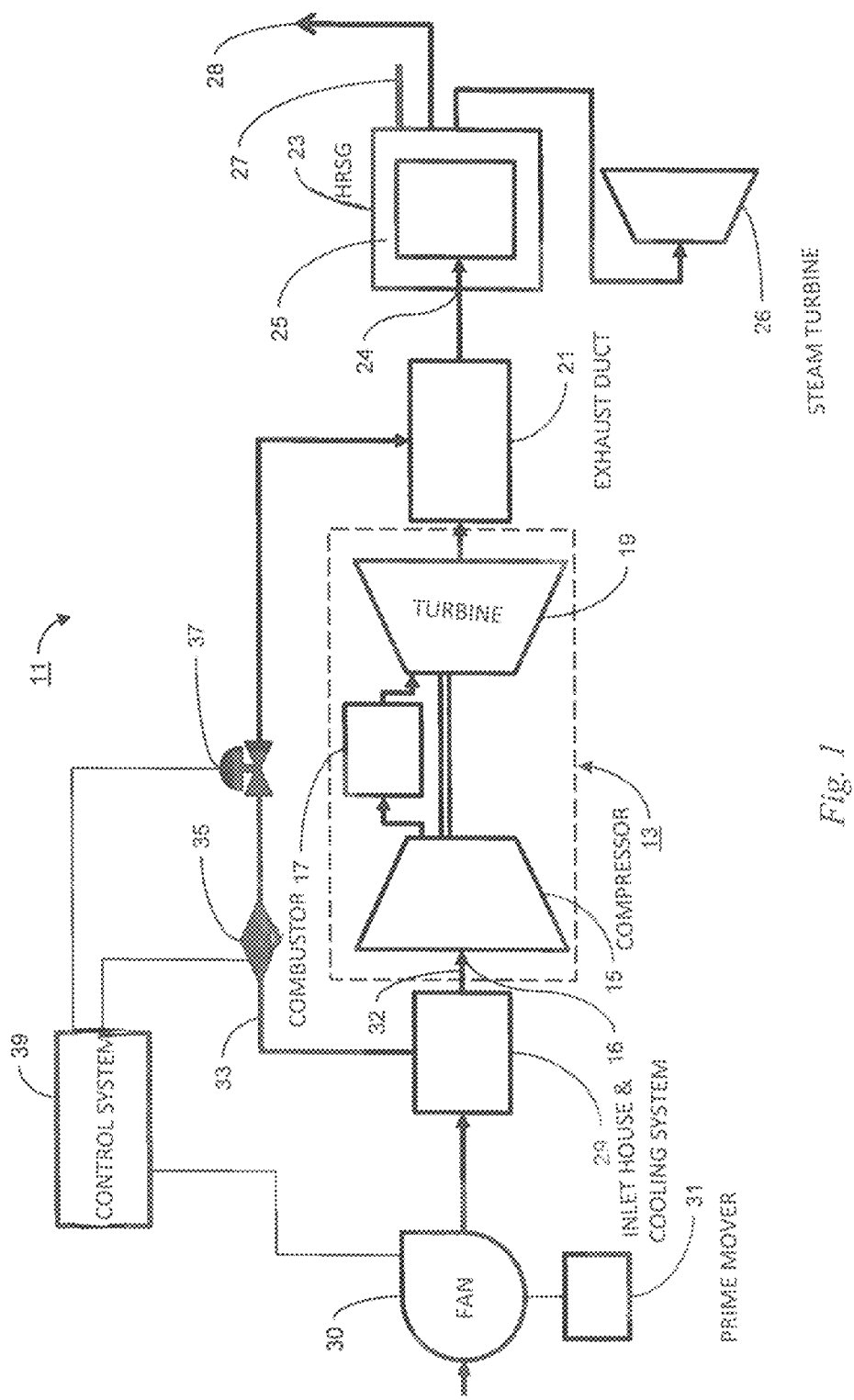
FIG. 1 is a schematic illustration of an embodiment of a supercharged combined cycle system with air bypass.

FIG. 1 is a schematic illustration of a supercharged combined cycle system with air bypass (SCCAB system 11) in accordance with one embodiment of the present invention. The SCCAB system 11 includes a gas turbine subsystem 13 that in turn includes a compressor 15, having a compressor inlet 16, a combustor 17 and a turbine 19. An exhaust duct 21 may be coupled to the turbine 19 and a heat recovery steam generator subsystem (HRSG 23). The HRSG 23 recovers heat from exhaust gases from the turbine 19 that are conveyed through HRSG inlet 24 to generate steam. The HRSG 23 may also include a secondary burner 25 to provide additional energy to the HRSG 23. Some of the steam and exhaust from the HRSG 23 may be vented to stack 27 or used to drive a steam turbine 26 and provide additional power. Some of the steam from the HRSG 23 may be transported through process steam outlet header 28 to be used for other processes. The SCCAB system 11 may also include an inlet house and cooling system 29. The inlet house and cooling system 29 is used to cool and filter the air entering the compressor inlet 16 to increase power and avoid damage to the compressor 15.

The SCCAB system 11 also includes a forced draft fan 30 used to create a positive pressure forcing air into the compressor 15. Forced draft fan 30 may have a fixed or variable blade fan (not shown). Forced draft fan 30 may be driven by a prime mover 31. The forced draft fan 30 provides a controllable air stream source though a duct assembly 32 and may be used to increase the mass flow rate of air into the compressor 15. The quantity of air going into the compressor is controlled by the prime mover 31. The compressor inlet 16 may be configured to accommodate slight positive pressure as compared to the slight negative pressure of a conventional design.

The SCCAB system 11 may also include a bypass 33 (which may include external ducting) that diverts a portion of the air flow from forced draft fan 30 into the exhaust duct 21. This increased air flow provides additional oxygen to the secondary burner 25 to avoid flame out or less than optimal combustion. Bypass 33 may be provided with a flow sensor 35 and a damper valve 37 to control the airflow through the bypass 33. A control system 39 may be provided to receive data from flow sensor 35 and to control the damper valve 37 and the prime mover 31. Control system 39 may be integrated into the larger control system used for operation control of SCCAB system 11. The airflow from the bypass is conveyed to the exhaust duct 21 where the temperature of the combined air and exhaust entering the HRSG 23 may be modulated.

Figure 2:
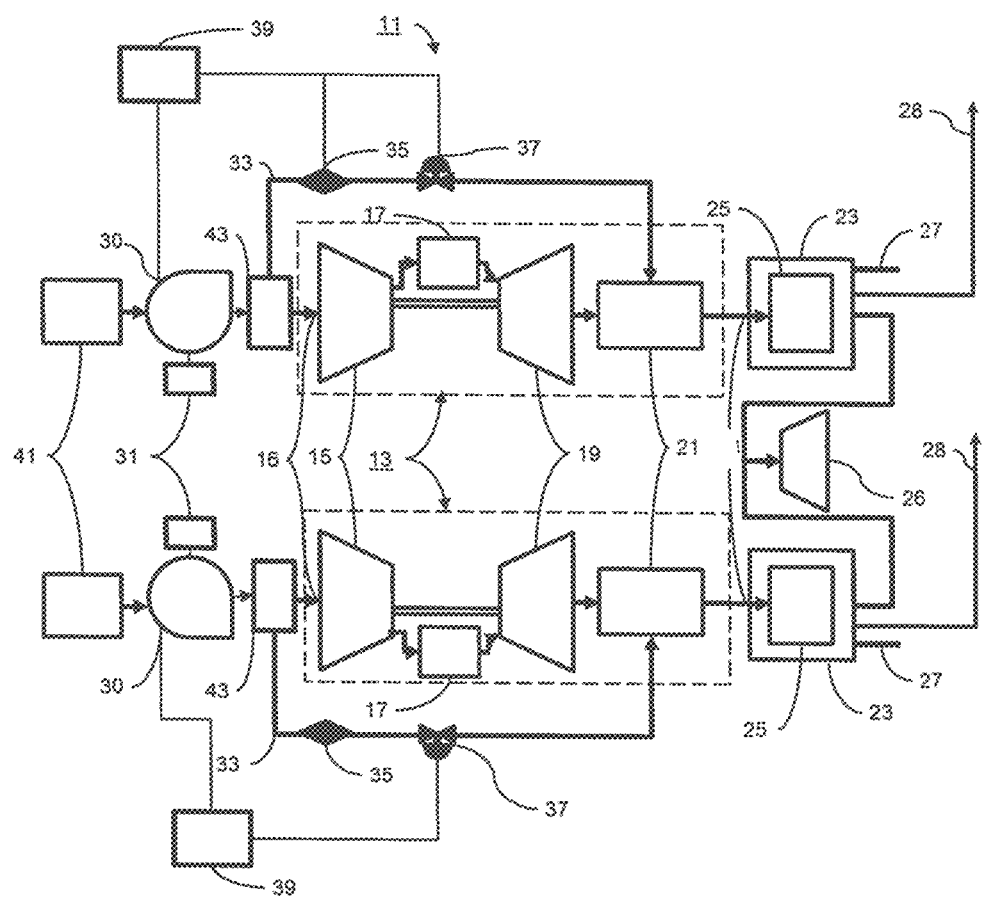
FIG. 2 is a schematic illustration of another embodiment of a supercharged combined cycle system with air bypass.

Illustrated in FIG. 2 is another embodiment of a SCCAB system 11 that includes a pair of gas turbine subsystem(s) 13. In this embodiment, the exhaust of the pair of gas turbine subsystem(s) 13 is used to drive a steam turbine 26. In this embodiment, an inlet house 41 is positioned upstream of the forced draft fan 30, and a cooling system 43, where the airflow from the fan may be cooled, is positioned downstream of the forced draft fan 30. The bypass 33 is coupled to the cooling system 43. One of ordinary skill in the art will recognize that although in this embodiment two gas turbine subsystem(s) 13 are described, any number of gas turbine subsystem(s) 13 in combination with any number of steam turbine(s) 26 may be used.

In operation, the SCCAB system 11 provides increased air flow into the HRSG 23 resulting in a number of benefits. The SCCAB system 11 may provide an operator with the ability to optimize combined cycle plant flexibility, efficiency and lifecycle economics. For example, boosting the inlet pressure of the gas turbine subsystem 13 improves output and heat rate performance. The output performance of the SCCAB system 11 may be maintained flat (zero degradation) throughout the life cycle of SCCAB system 11 by increasing the level of supercharging (and parasitic load to drive the forced draft fan 30) over time commensurate with the degradation of SCCAB system 11. Another benefit that may be derived from the SCCAB system 11 is the expansion of the power generation to steam production ratio envelope. This may be accomplished by modulating the exhaust gas temperature at HRSG inlet 24 with air from the forced draft fan 30. Another benefit that may be derived from the SCCAB system 11 is an improved start up rate as a result of the reduction in the purge cycle (removal of built up gas). The SCCAB system 11 may also provide an improved load ramp rate resulting from the modulation of the exhaust temperature at the exhaust duct 21 with air from the forced draft fan 30 provided through the bypass 33. The forced draft fan 30 of the SCCAB system 11 also provides an effective means to force-cool the gas turbine subsystem 13 and HRSG 23, reducing maintenance outage time and improving system availability. The forced draft fan 30 provides comparable benefit for simple cycle and combined-cycle configurations for all gas turbine subsystem(s) 13 delivering in the range of 20% output improvement under hot ambient conditions with modest capital cost.

Figure 3:
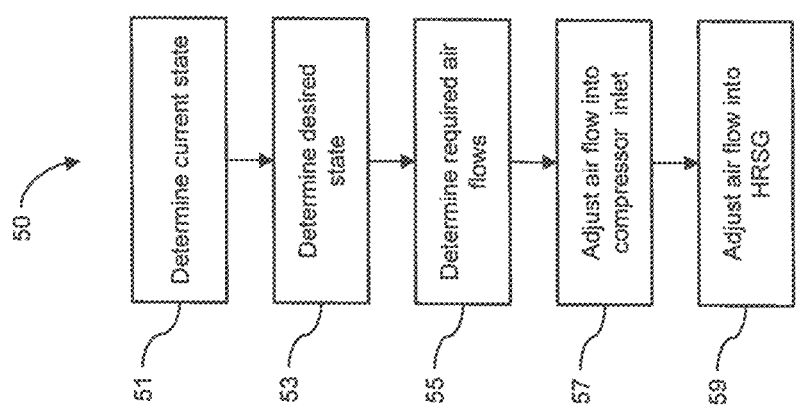
FIG. 3 is a flow chart of an embodiment of a method implemented by a supercharged combined cycle system with air bypass.

The SCCAB system 11 may implement a method of maintaining the output of a combined cycle plant over time (method 50) as illustrated with reference to FIG. 3. In step 51, the method 50 may determine the current state, and in step 53, the method 50 may determine a desired state. The desired state may be to maintain a nominal output over time to compensate for performance losses. Performance losses typically arise as a result of wear of components in the gas turbine over time. These losses may be measured or calculated. In step 55, the method 50 may determine the required increased air mass flow to maintain the desired output. Based on that determination, the method 50 may, in step 57 adjust the air mass flow into the compressor inlet 16. In step 59, the method 50 may adjust the combined air and exhaust mass flow into the HRSG inlet 24.

Figure 4:
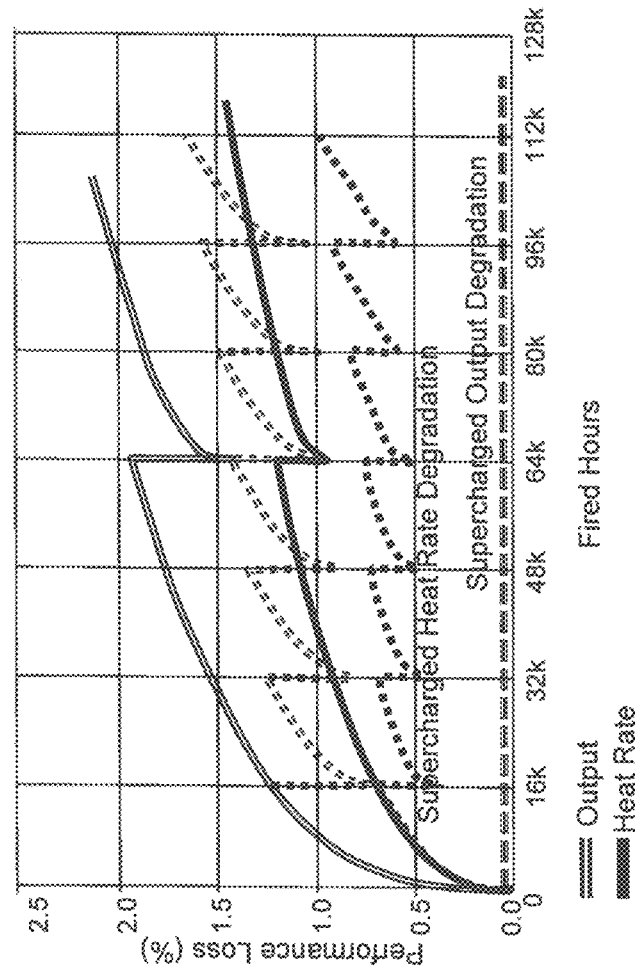
FIG. 4 is a chart illustrating a result accomplished by a supercharged combined cycle system with air bypass.

FIG. 4 illustrates the loss of output and heat rate over time (expressed in percentages) of a conventional combined cycle system and a SCCAB system 11. Gas turbines suffer a loss in output over time, as a result of wear of components in the gas turbine. This loss is due in part to increased turbine and compressor clearances and changes in surface finish and airfoil contour. Typically maintenance or compressor cleaning cannot recover this loss, rather the solution is the replacement of affected parts at recommended inspection intervals. However, by increasing the level of supercharging using forced draft fan 30, output performance may be maintained, although at a cost due to the parasitic load to drive the forced draft fan 30. The top curve (unbroken double line) illustrates the typical output loss of a conventional combined cycle system. The second curve (broken double lines) illustrates the expected output loss with periodic inspections and routine maintenance. The lower curve (broken triple line) shows that the output loss of an SCCAB system 11 may be maintained at near 0%. Similarly, the heat rate degradation of a conventional combined cycle system (single solid curve) may be significantly improved with an SCCAB system 11.

FIG. 5 illustrates a method of controlling the steam output of a SCCAB system 11 (method 60). In step 61, method 60 may initially determine the current state. In step 63, the method 60 may also determine the desired output and steam flow. In step 65, the method 60 may determine the required increased air flow to the compressor inlet 16 and the HRSG inlet 24. In step 67, method 60 may then adjust the air flow into the compressor inlet 16 and in step 69, adjust the combined exhaust and air flow into the HRSG inlet 24, to provide the desired steam output.

FIG. 6 illustrates an expanded operating envelope available to maintain constant steam flow. The vertical axis measures output in MW and horizontal axes measures steam mass flow. The interior area (light vertical cross hatch) shows the envelope of a conventional combined cycle system. The envelope of an SCCAB system 11 is shown in diagonal cross hatching, and a larger area illustrates the performance of an SCCAB system 11 combined with secondary firing in the HRSG 23.

Figure 7:
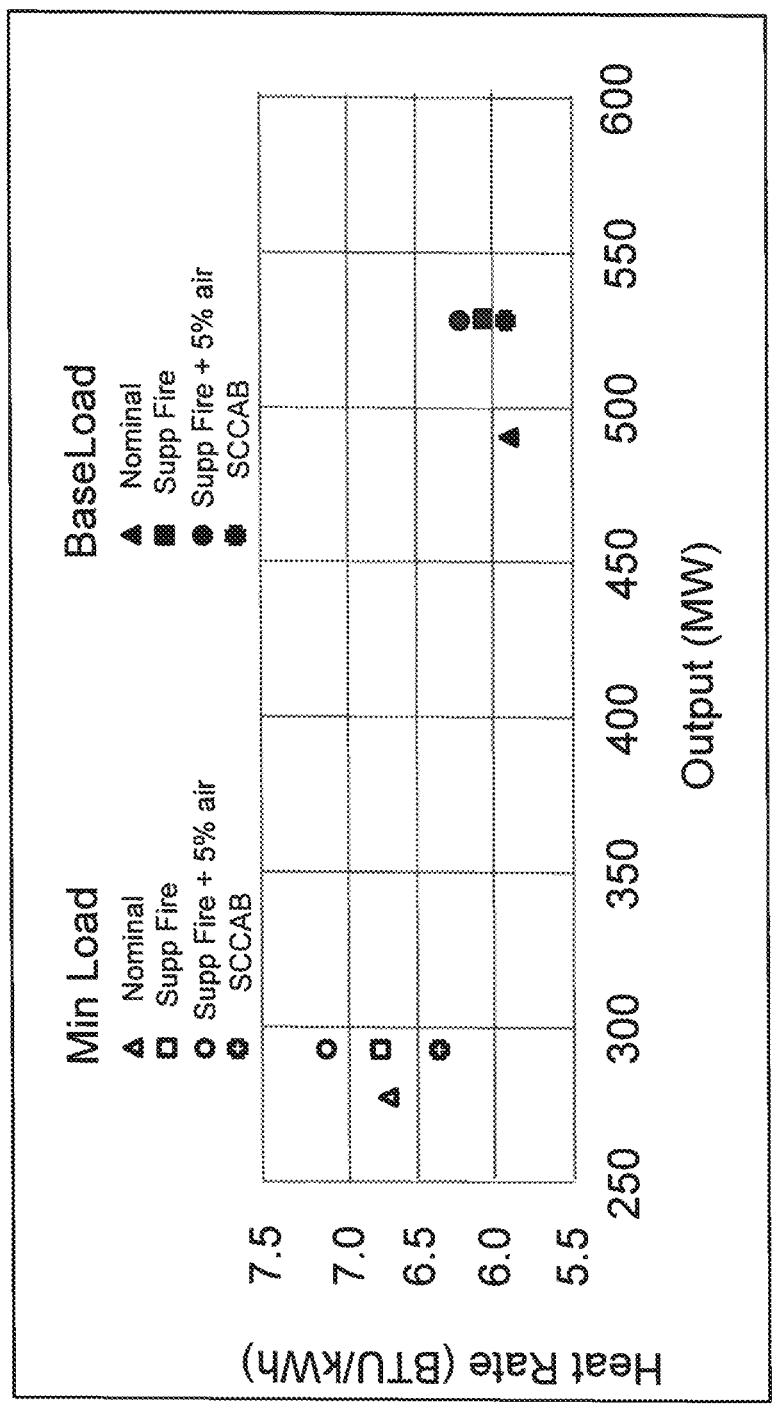
FIG. 7 is a chart illustrating a result accomplished by a supercharged combined cycle system with air bypass.

FIG. 7 is a chart that illustrates the improved operational performance of an SCCAB system 11 at a specific ambient temperature in comparison with conventional combined cycle systems at minimum and base loads. The horizontal axis measures output in MW and the vertical axis measures heat rate (the thermal energy (BTU's) from fuel required to produce one kWh of electricity). The chart illustrates the improved efficiency delivered by the SCCAB system 11.

Figure 8:
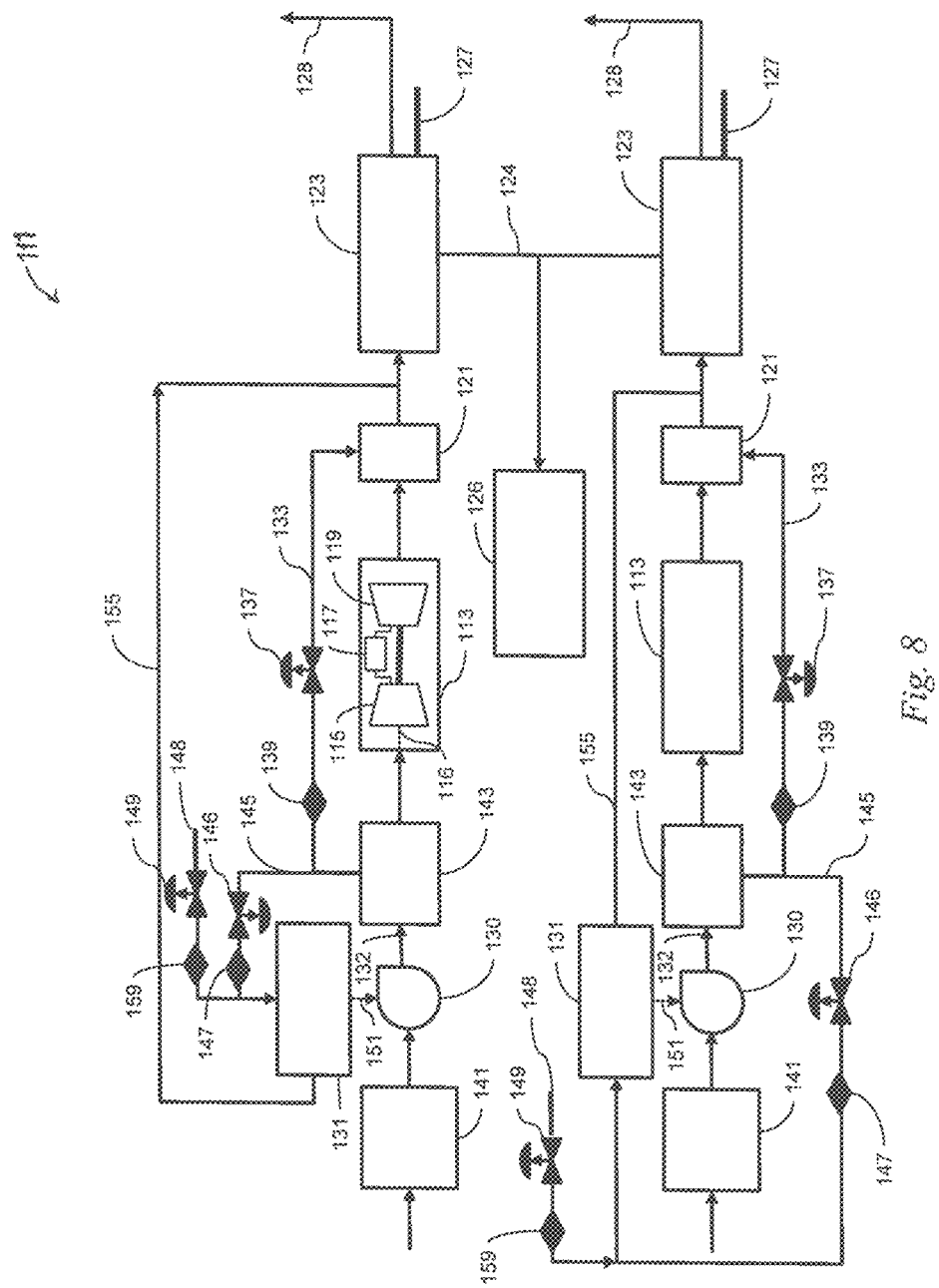
FIG. 8 is a schematic illustration of another embodiment of a supercharged combined cycle system with air bypass.

Illustrated in FIG. 8 is a schematic illustration of a combined cycle system 111 in accordance with another embodiment of the present invention. The combined cycle system 111 includes a gas turbine subsystem 113 that in turn includes a compressor 115, having a compressor inlet 116, a combustor 117 and a turbine 119. An exhaust duct 121 may be coupled to the gas turbine subsystem 113 and a heat recovery steam generator subsystem (HRSG 123). The HRSG 123 recovers heat from exhaust gases from the gas turbine subsystem 113 that are conveyed through HRSG inlet 124 to generate steam. Some of the steam and exhaust from the HRSG 123 may be used to drive a steam turbine 126 and provide additional power, or vented to stack 127. Some of the steam from the HRSG 123 may be transported through process steam outlet header 128 to be used for other processes.

The combined cycle system 111 also includes a forced draft fan 130 used to create a positive pressure forcing air into the compressor 115. Forced draft fan 130 may be a fixed or variable blade fan. Forced draft fan 130 may be driven by a prime mover 131. The forced draft fan 130 provides a controllable air stream source though a duct assembly 132 and may be used to increase the mass flow rate of air into the gas turbine subsystem 113. The quantity of air going into the gas turbine subsystem 113 is controlled by the prime mover 131.

The combined cycle system 111 may also include an inlet house 141 and cooling system 143. The inlet house 141 and cooling system 143 cool and filter the air entering the gas turbine subsystem 113 to increase power and avoid damage to the compressor. In some embodiments the inlet house 141 and the cooling system 143 may be combined and disposed downstream from the forced draft fan 130.

The combined cycle system 111 may also include a bypass 133 (which may include external ducting) that diverts a portion of the air flow from forced draft fan 130 into the exhaust duct 121. Bypass 133 may be provided with a flow sensor 139 and a bypass damper valve 137 to control the airflow through the bypass 133. The airflow from the bypass is conveyed to the exhaust duct 121 where the temperature of the combined air and exhaust entering the HRSG 123 may be modulated.

The combined cycle system 111 may also include a drive bypass 145 coupled to the prime mover 131. The drive bypass 145 is provided with a drive damper valve 146 and a drive system sensor 147. The prime mover 131 may also be provided with a secondary conduit 148 having a secondary damper valve 149 and a secondary sensor 150. The prime mover is coupled to the forced draft fan 130 by a conduit 151. In some embodiments, the exhaust of the prime mover 131 may be conveyed to the HRSG 123 through a drive exhaust conduit 155.

In operation, the prime mover 131 drives the forced draft fan 130 to provide an air flow at a predetermined mass flow rate. The air flow may be cooled by cooling system 143. The airflow may be divided into a first mass flow quantity to be conveyed to the compressor inlet 116, a second mass flow quantity to be conveyed to the exhaust duct 121, and in some cases a third mass flow quantity to be conveyed to the prime mover 131. Control of the first mass flow quantity, the second mass flow quantity, and the third mass flow quantity is effected through the controls of bypass damper valve 137, drive damper valve 146, and secondary damper valve 149. By controlling the first mass flow quantity, the second mass flow quantity and the third mass flow quantity the operator is provided with more effective control of the operating envelope of the combined cycle system 111.

Figure 9:
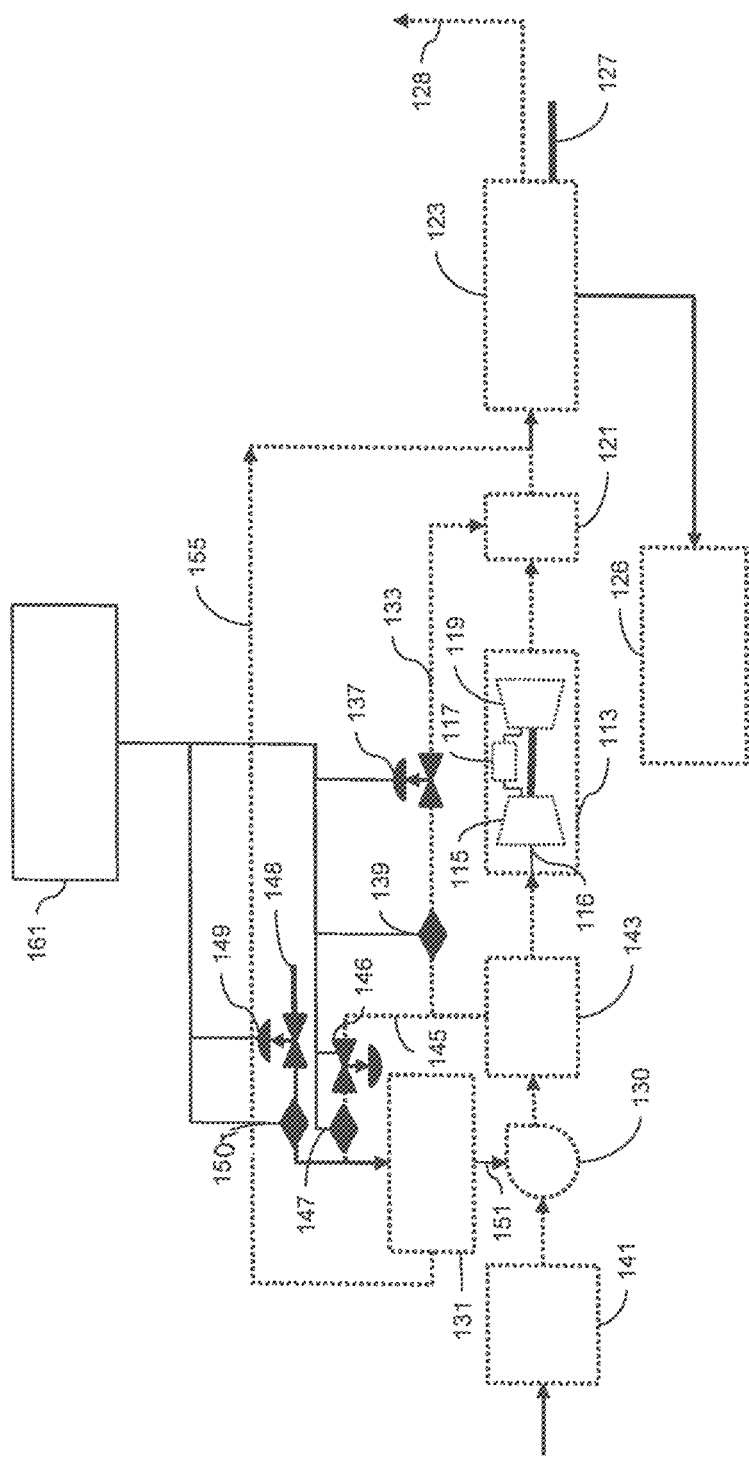
FIG. 9 is a schematic illustration of an embodiment of a control system used to control a supercharged combined cycle system with air bypass.

FIG. 9 illustrates the control system 161 used to control bypass damper valve 137, drive damper valve 146 and secondary damper valve 149. Control system 161 receives readings from flow sensor 139, drive system sensor 147 and secondary sensor 150. The control system 161 may be a conventional General Electric Speedtronic™ Mark VI Gas Turbine Control System. The SpeedTronic controller monitors various sensors and other instruments associated with a gas turbine. In addition to controlling certain turbine functions, such as fuel flow rate, the SpeedTronic controller generates data from its turbine sensors and presents that data for display to the turbine operator. The data may be displayed using software that generates data charts and other data presentations, such as the General Electric Cimplicity™ HMI software product.

The Speedtronic™ Mark VI Gas Turbine Control System is a computer system that includes microprocessors that execute programs to control the operation of the gas turbine using sensor inputs and instructions from human operators. The control system includes logic units, such as sample and hold, summation and difference units, which may be implemented in software or by hardwire logic circuits. The commands generated by the control system processors cause actuators on the gas turbine to, for example, adjust the fuel control system that supplies fuel to the combustion chamber, set the inlet guide vanes to the compressor, and adjust other control settings on the gas turbine.

Figure 10:
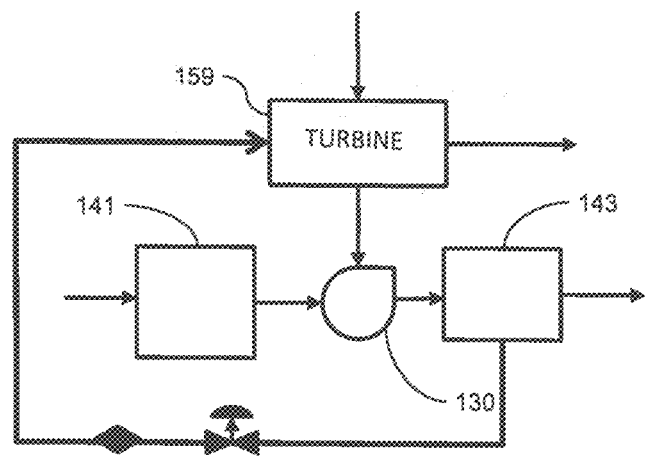
FIG. 10 is a schematic illustration of an embodiment of a prime mover used to drive a forced draft fan.

Illustrated in FIG. 10 is an embodiment where the prime mover 131 is a gas turbine 159. Gas turbine 159 provides certain benefits over another type of prime mover 131. These benefit include greater reliability, particularly in applications where sustained high power output is required and high efficiencies at high loads. The drawbacks to the use of a gas turbine 159 as a prime mover 131 include lower efficiency than reciprocating engines at part loads and higher costs. In operation the gas turbine 159 receives supercharged and cooled air through drive bypass 145 and its exhaust may be conveyed to the HRSG 123 though drive exhaust conduit 155 for best cycle efficiency and flexibility. This results in excellent full-load and part-load efficiency and operational flexibility. The forced draft fan 130 driven by gas turbine 159 eliminates output degradation over time by trading efficiency to make up for output degradation. The forced draft fan 130 driven by gas turbine 159 also provides the operator with the ability to expand the power generation to steam production ratio envelope. Furthermore, the forced draft fan 130 driven by gas turbine 159, increases net power production and improves efficiency of gas turbine subsystem 113 and combined cycle system 111. By expanding the operating envelope, the operator may reduce the negative capital & operating cost impact of needing to add a unit at a multi-unit power block where there is a partial output shortfall. The use of a gas turbine 159 has the disadvantages of high capital and maintenance costs. Gas turbine 159 provides a subsystem of medium complexity with high cycle efficiency and very high peak output at fixed supercharger boost.

Figure 11:
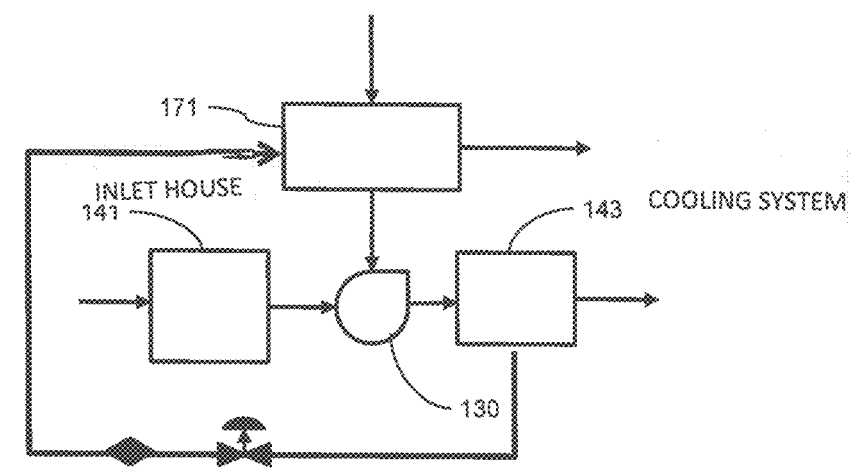
FIG. 11 is a schematic illustration of an embodiment of a prime mover used to drive a forced draft fan.

FIG. 11 illustrates another embodiment where an aeroderivative gas turbine 171 is used as the prime mover 131. An aeroderivative gas turbine 171 is a gas turbine derived from an aviation turbine. The decision to use aeroderivative gas turbine 171 is mainly based on economical and operational advantages. They are relatively light weight and offer high performance and efficiency. Aeroderivative gas turbine 171 permits efficient control of torque together with potential for integrated control. Common economic/operational advantages and benefits of the aeroderivative gas turbine 171 compared to conventional heavy frame gas turbine drivers are a 10 to 15 percent improvement in efficiency. An aeroderivative gas turbine 171 provides a smooth, controlled start. Aeroderivative gas turbine 171 has higher availability and operational reliability and its wide load range permits economically optimized power control. An aeroderivative gas turbine 171 also provides an advantage over conventional heavy frame gas turbine drivers due to its ability to be shut down, and ramped up rapidly and to handle load changes more efficiently. An aeroderivative gas turbine 171 provides high cycle efficiency and very high peak output at a fixed supercharger boost. The advantages of the aeroderivative gas turbine 171 for this application must be balanced against some disadvantages, including high capital costs and very high maintenance costs.

Figure 12:
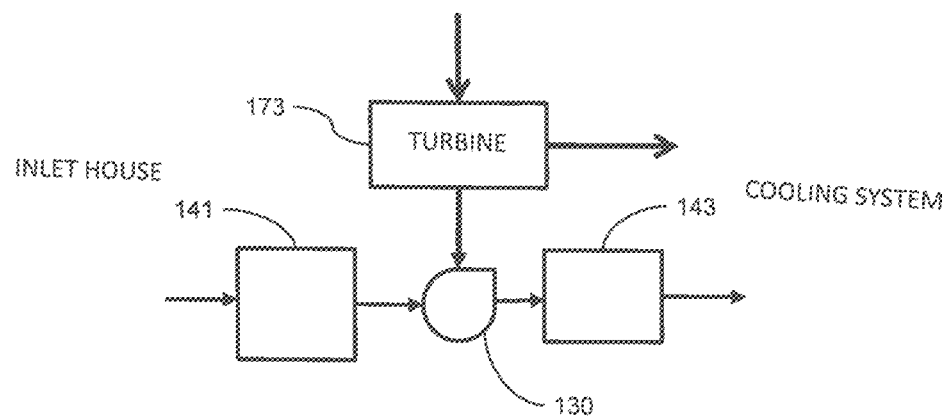
FIG. 12 is a schematic illustration of an embodiment of a prime mover used to drive a forced draft fan.

FIG. 12 illustrates another embodiment where a steam turbine 173 is used as the prime mover 131. A steam turbine is a device that extracts thermal energy from pressurized steam and uses it to do mechanical work on a rotating output shaft. The use of a steam turbine 173 provides the advantage of being able to use wide range of fuels to drive the steam turbine 173. In comparison to the other prime movers, the steam turbine has an average capital cost, maintenance cost, cycle efficiency, and peak output at fixed supercharger boost. Steam turbine 173 also has a high subsystem complexity. However, steam turbine 173 has the disadvantage of requiring boiler and other equipment and a higher price-to-performance ratio. A steam turbine 173 has a slow load change behavior, which means once running the steam turbine 173 cannot be stopped quickly. A specific amount of time is needed to slow down its revolutions. A steam turbine 173 also has poor part load performance.

Figure 13:
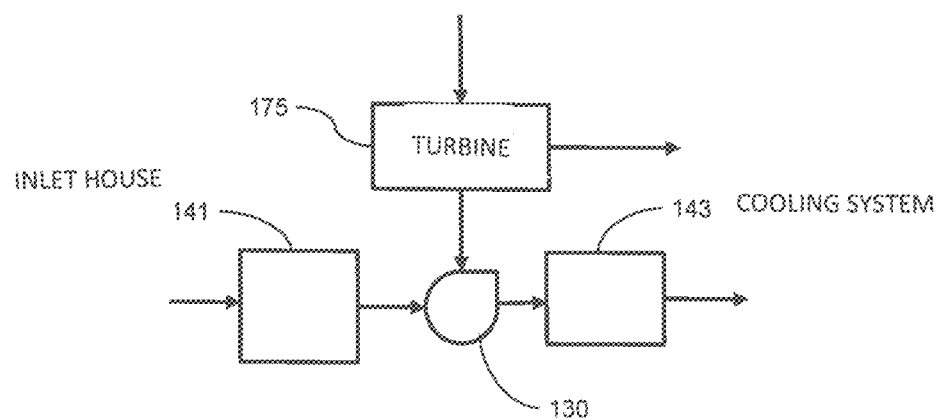
FIG. 13 is a schematic illustration of an embodiment of a prime mover used to drive a forced draft fan.

FIG. 13 illustrates another embodiment where an induction motor 175 is used as the prime mover 131. An induction motor 175 is a type of AC motor where power is supplied to the rotor by means of electromagnetic induction, rather than a commutator or slip rings as in other types of motors. Induction motor 175 has the advantage of being rugged, easy to operate, and having low capital and maintenance costs. Induction motor 175 also has the advantage of providing a subsystem of low complexity. Another advantage of an induction motor 175 is the ability to regulate the torque output and modulate the energy output of the induction motor 175. Induction motor 175 has the disadvantage of low cycle efficiency and low peak output at fixed supercharger boost.

Figure 14:
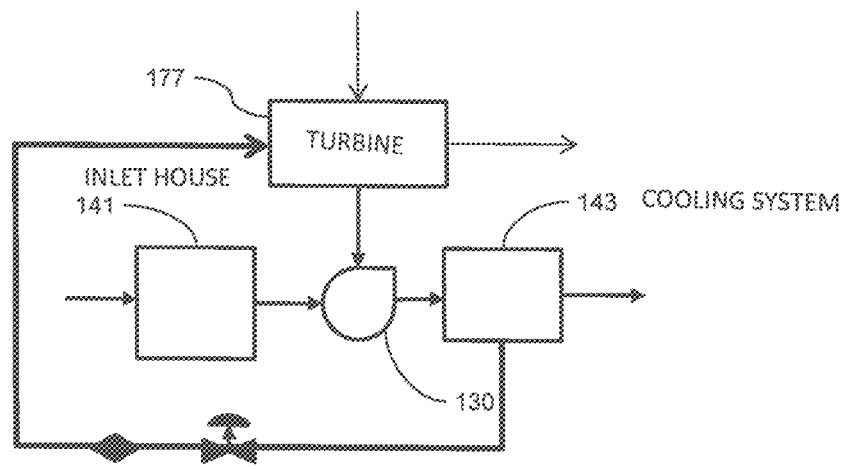
FIG. 14 is a schematic illustration of an embodiment of a prime mover used to drive a forced draft fan.

FIG. 14 illustrates another embodiment where a reciprocating engine 177 is used as the prime mover 131. The reciprocating engine 177, also often known as a piston engine, is a heat engine such as a diesel engine that uses one or more reciprocating pistons to convert pressure into a rotating motion. Use of a reciprocating engine 177 to drive the forced draft fan 130 has the advantage of providing high efficiencies at part load operation and high cycle efficiencies. Peak output at fixed supercharger boost is very high with a reciprocating engine 177. Additionally a reciprocating engine 177 has short start-up times to full loads. A reciprocating engine has average capital costs and maintenance cost. The complexity of the subsystem is average when compared to other prime movers.

Figure 15:
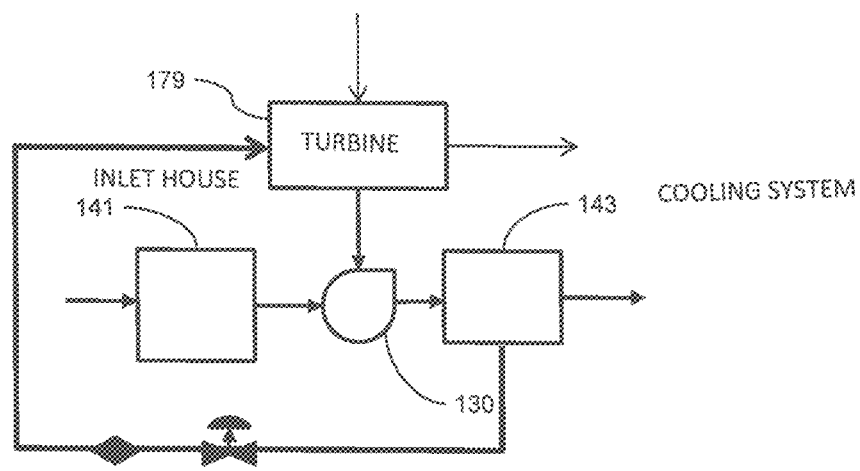
FIG. 15 is a schematic illustration of an embodiment of a prime mover used to drive a forced draft fan.

Illustrated in FIG. 15 is another embodiment where a variable frequency drive (VFD 179) is used as the prime mover 131. VFD 179 is a drive that controls the rotational speed of an electric motor by controlling the frequency of the electrical power supplied to the motor. VFD 179 provides a number of advantages, including low subsystem complexity and low maintenance costs as well as energy savings from operating at lower than nominal speeds. VFD 179 has average capital costs when compared with other prime movers and provides average cycle efficiency. Another advantage is that VFD 179 may be gradually ramped up to speed, lessening the stress on the equipment. A disadvantage is lower than average peak output at a fixed supercharger boost.

The advantages and disadvantages of the different prime mover(s) 131 are summarized in the table in FIG. 16.

Figure 17:
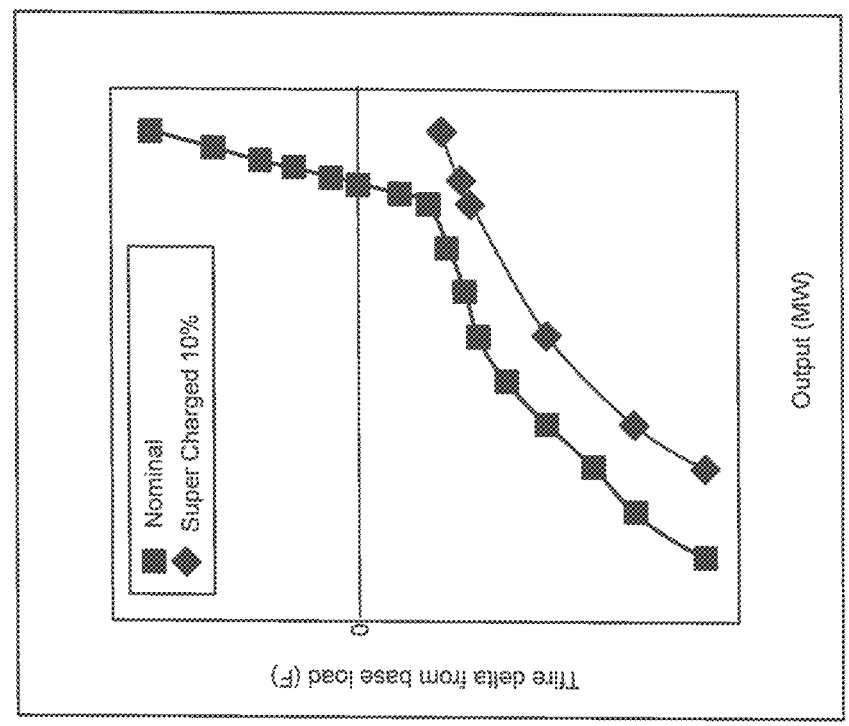
FIG. 17 is a chart showing the relationship between output and a change in T-fire for a gas turbine that is not supercharged (nominal) and a gas turbine that is supercharged by 10%.

Illustrated in FIG. 17 is the relationship between output and a change in the firing temperature ("T-fire") for a gas turbine that is not supercharged (nominal) and a gas turbine that is supercharged by 10%. From the chart it is apparent that for a given output, a lower T-fire can be obtained with supercharging. The difference is most pronounced at peak loads where under nominal operations the change in T-fire is positive (i.e. T-fire increases when compared to T-fire at base load.). But, under supercharged conditions the change in T-fire remains negative.

Figure 18:
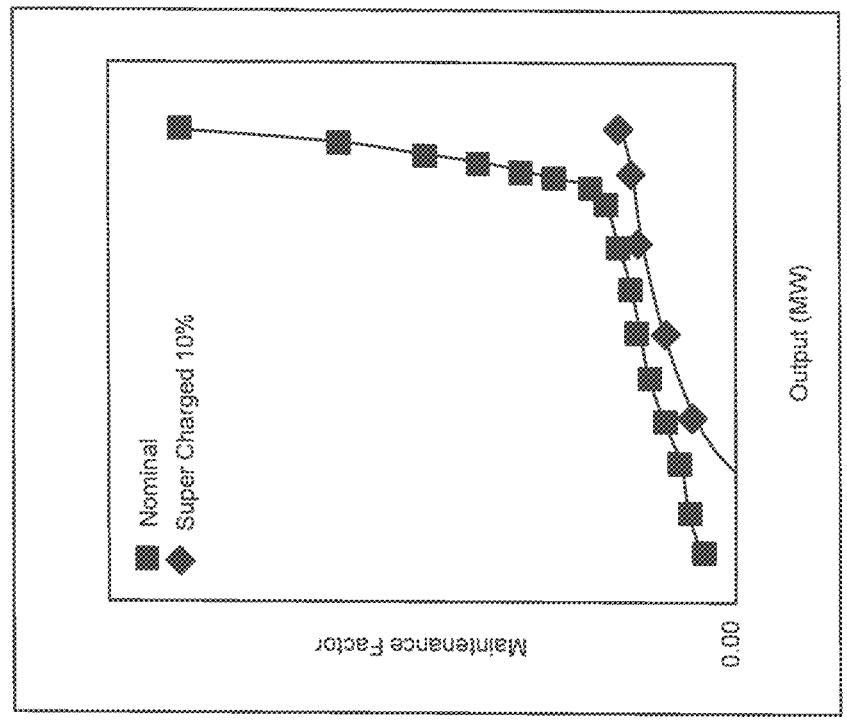
FIG. 18 is a chart illustrating the impact of supercharging on the maintenance factor.

Illustrated in FIG. 18 is the impact of supercharging on the maintenance factor. Again, at peak loads the maintenance factor is significantly lower in the supercharged case compared to the maintenance factor for the nominal case.

Figure 19:
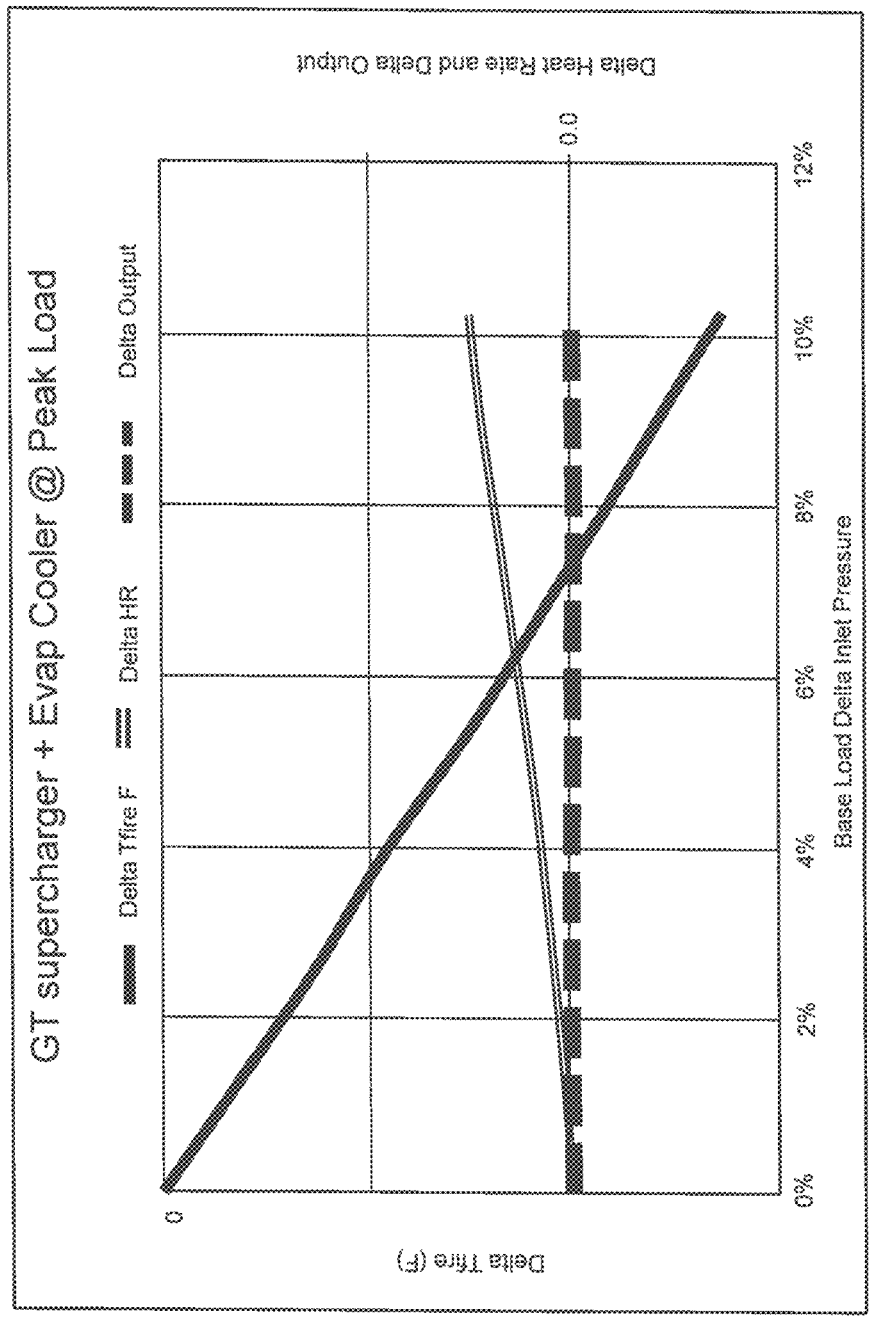
FIG. 19 is a chart illustrating the impact of supercharging on T-fire, heat rate and output at peak load.
Figure 20:
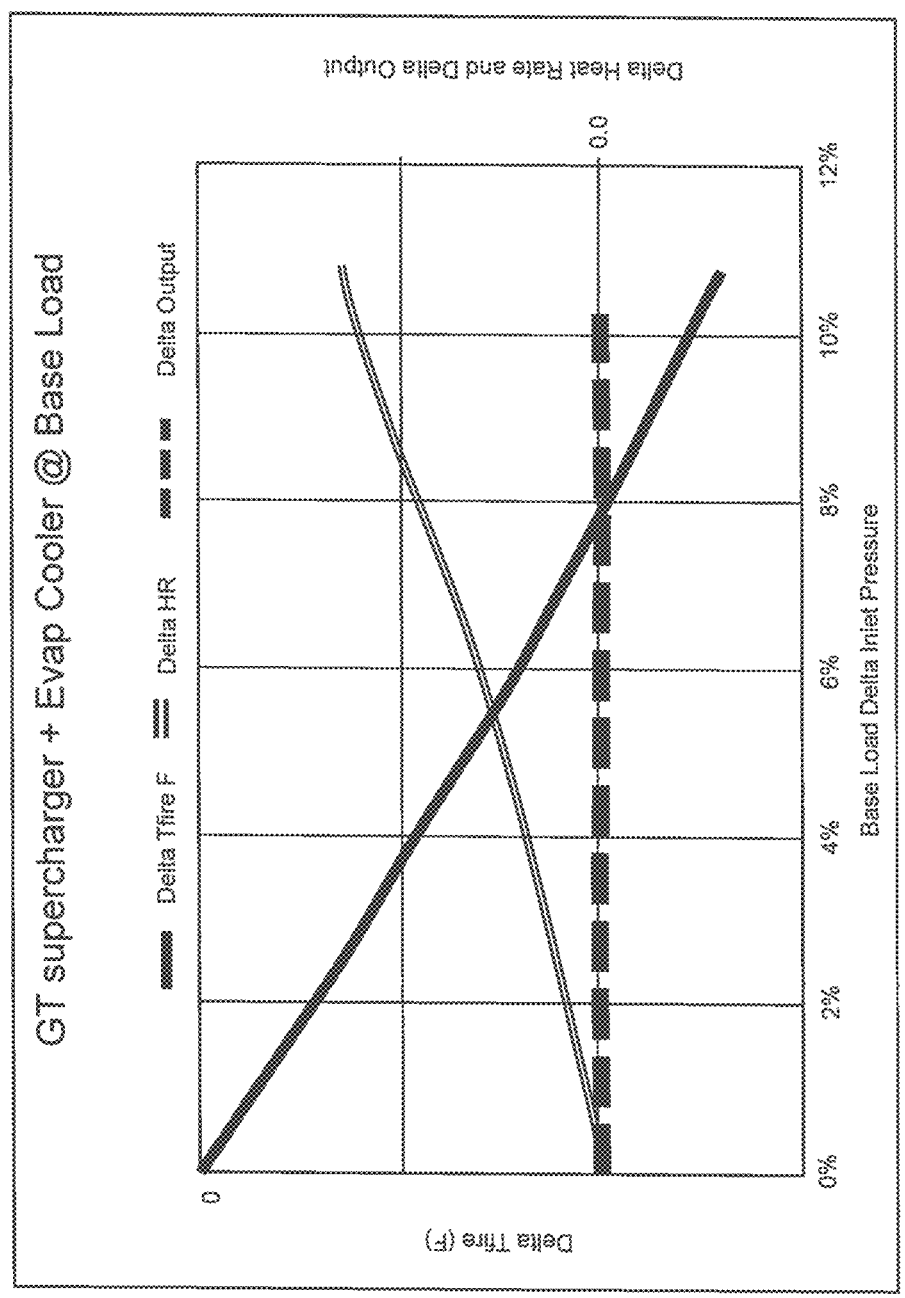
FIG. 20 is a chart illustrating the impact of supercharging on T-fire, heat rate and output at base load.
Figure 21:
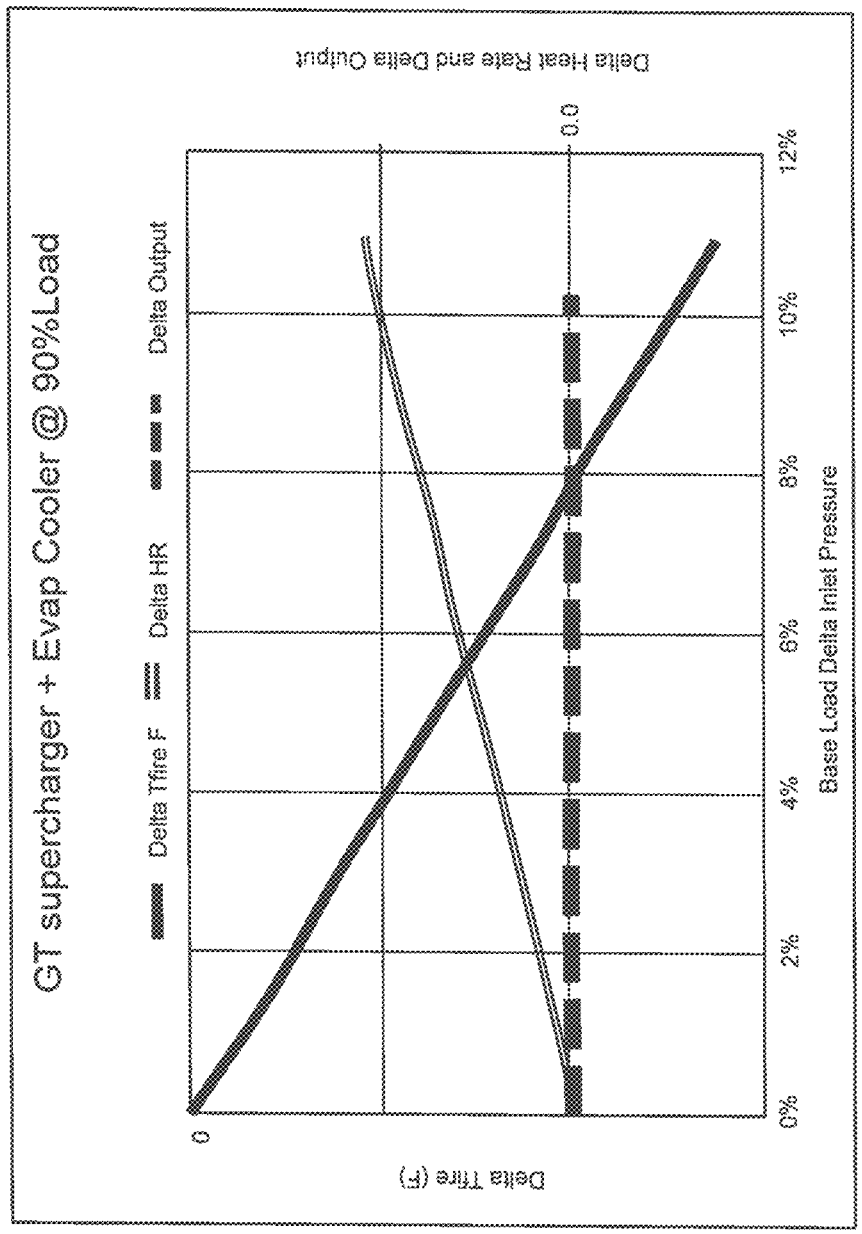
FIG. 21 is a chart illustrating the impact of supercharging on T-fire, heat rate and output at 90% load.
Figure 22:
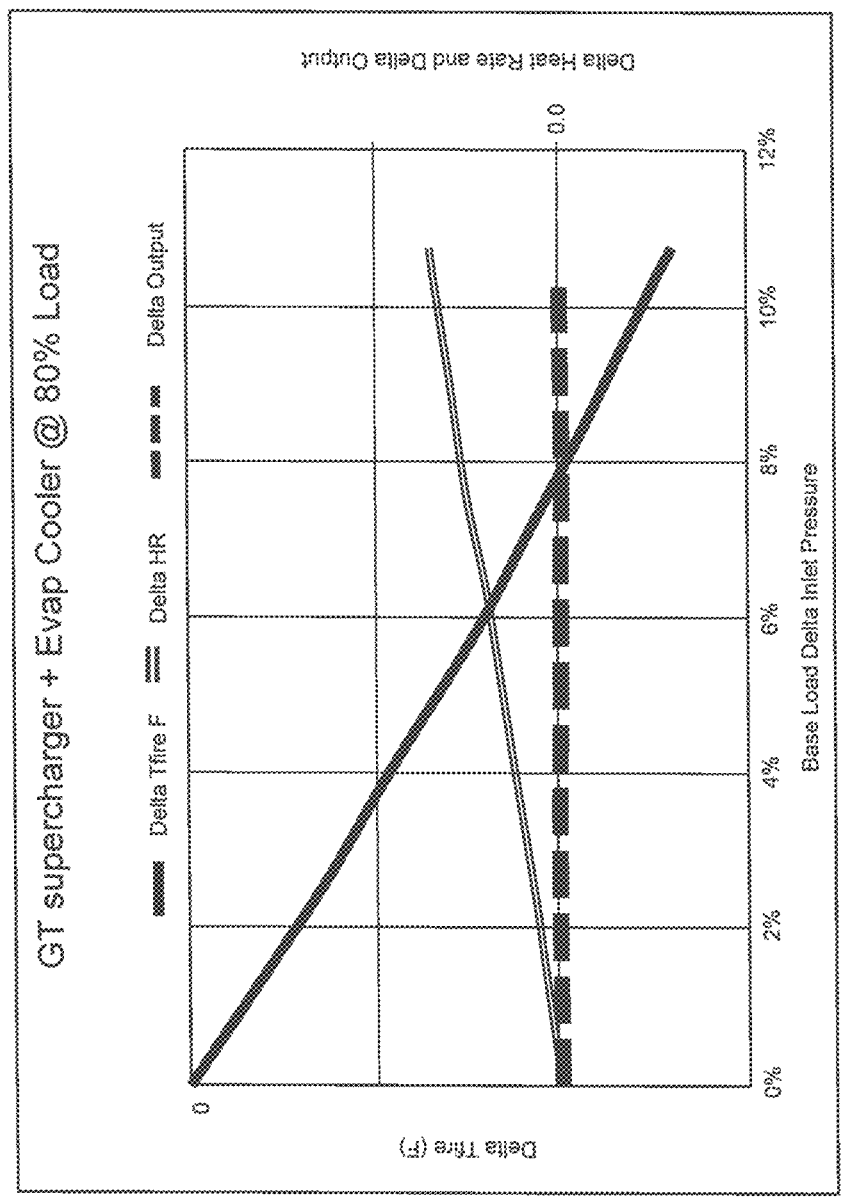
FIG. 22 is a chart illustrating the impact of supercharging on T-fire, heat rate and output at 80% load.

FIG. 19 illustrates the impact of supercharging on T-fire, heat rate and output at peak load. From the delta T-fire curve, it can be ascertained that significant negative change in T-fire may be obtained by supercharging without any impact on output. FIGS. 20-22 illustrate the impact of supercharging on T-fire, heat rate and output at base load, 90% load, and 80% load respectively. The charts illustrate the impact of supercharging on delta T-fire, in effect demonstrating that supercharging can reduce T-fire at different loads without having a significant impact on the output.

Figure 23:
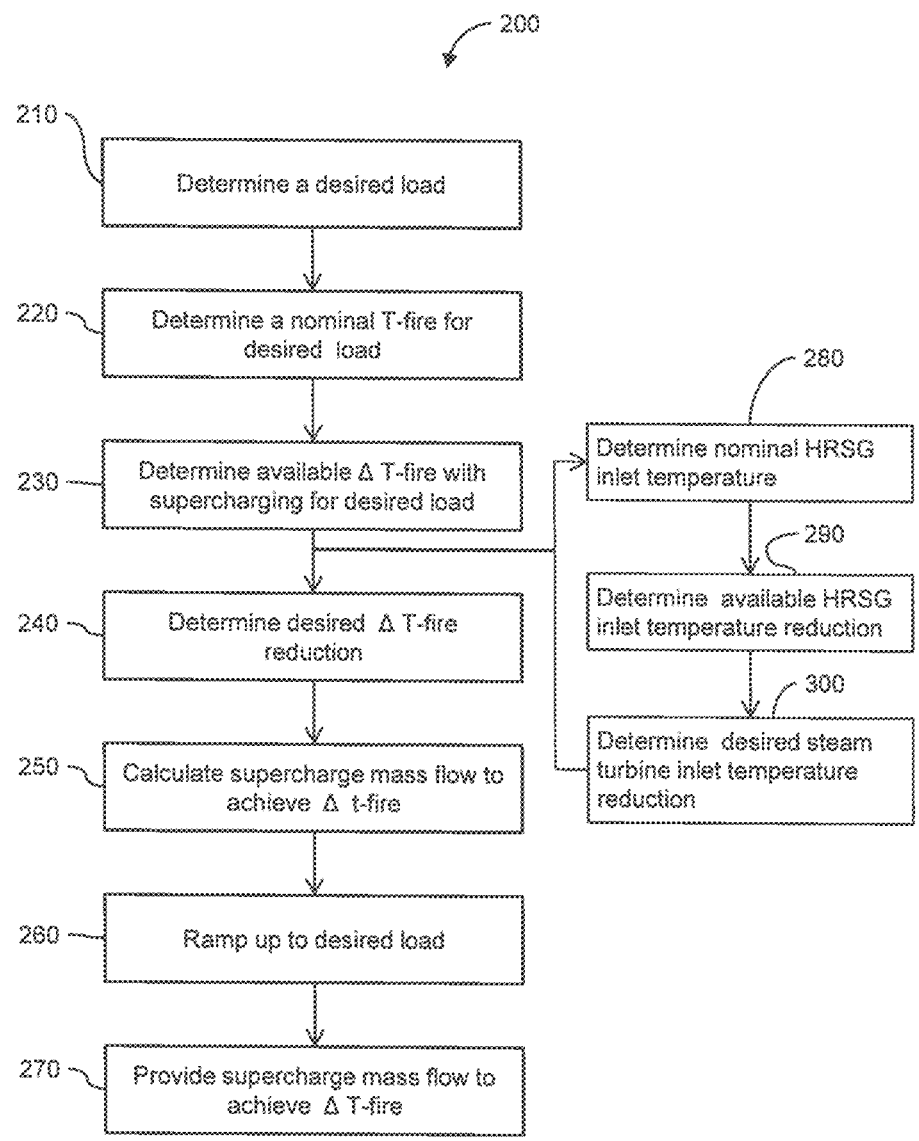
FIG. 23 is a flow chart for a method for extending the life of hot gas path parts of a gas turbine system using supercharging.

Illustrated in FIG. 23 is a flowchart for a method 200 for extending the life of hot gas path parts of a gas turbine system using supercharging.

In step 210, the method 200 determines a desired load.

In step 220, the method 200 determines a nominal T-fire for the desired load.

In step 230, the method 200 determines the available reduction in T-fire with supercharging for the desired load.

In step 240, the method 200 determines a desired reduction in T-fire.

In step 250, method 200 calculates the supercharged mass flow required to achieve the reduction in T-fire.

In step 260, the method 200 increases the load to the desired load.

In step 270, the method 200 provides the supercharged mass flow required to achieve the reduction in T-fire.

If the gas turbine system includes an HRSG, the method 200 may implement a step 280 to determine a nominal HRSG inlet temperature.

In step 290, the method 200 may determine the available HRSG inlet temperature reduction with supercharging.

In step 300 the method 200 may determine the desired steam turbine inlet temperature reduction to achieve a desired HRSG inlet temperature. The method 200 proceeds to step 242 to determine the desired T-fire reduction. By reducing T-fire and the HRSG inlet temperature an operator can decrease the maintenance factor hot gas path components of the gas turbine and hot gas path components of the steam turbine coupled to the HRSG.

Figure 24:
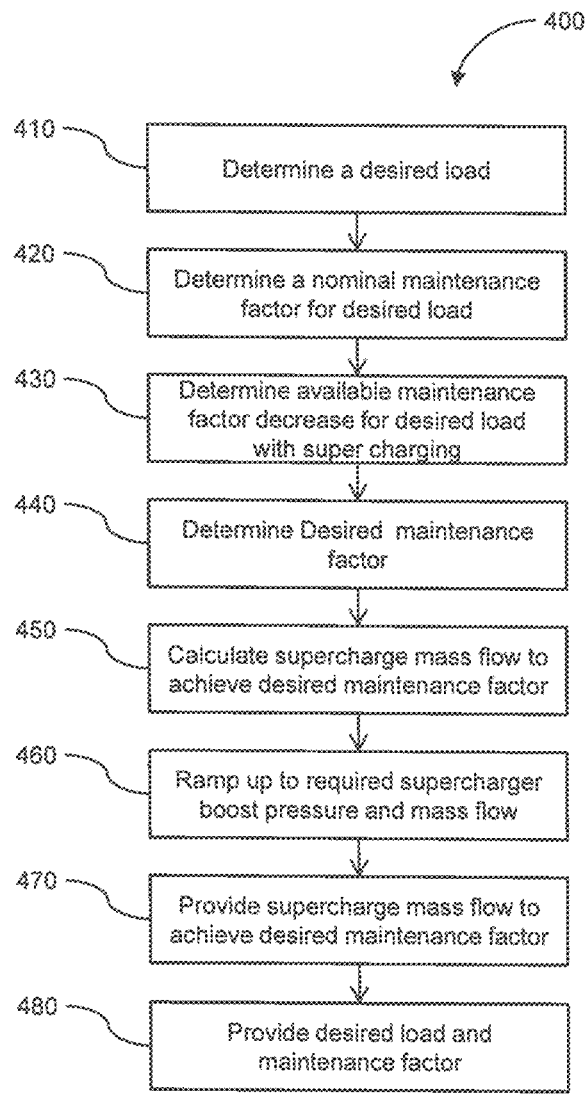
FIG. 24 is a flowchart of a method for reducing a maintenance factor in a turbine system.

Illustrated in FIG. 24 is a flowchart of a method 400 for reducing a maintenance factor in a turbine system.

In step 410, the method 400 determines a desired load.

In step 420, the method 400 determines a nominal maintenance factor for the desired load.

In step 430, the method 400 determines the available maintenance factor decrease for the desired load with supercharging.

In step 440, the method 400 determines the desired maintenance factor.

In step 450, the method 400 calculates the supercharged mass flow required to achieve the desired maintenance factor.

In step 460, the method 400 ramps up the supercharge to the desired boost pressure and mass flow.

In step 470, the method 400 provides the supercharge mass flow to achieve the desired maintenance factor to the combustor exhaust.

In step 480 the gas turbine system is adjusted to the desired load and maintenance factor.

Figure 25:
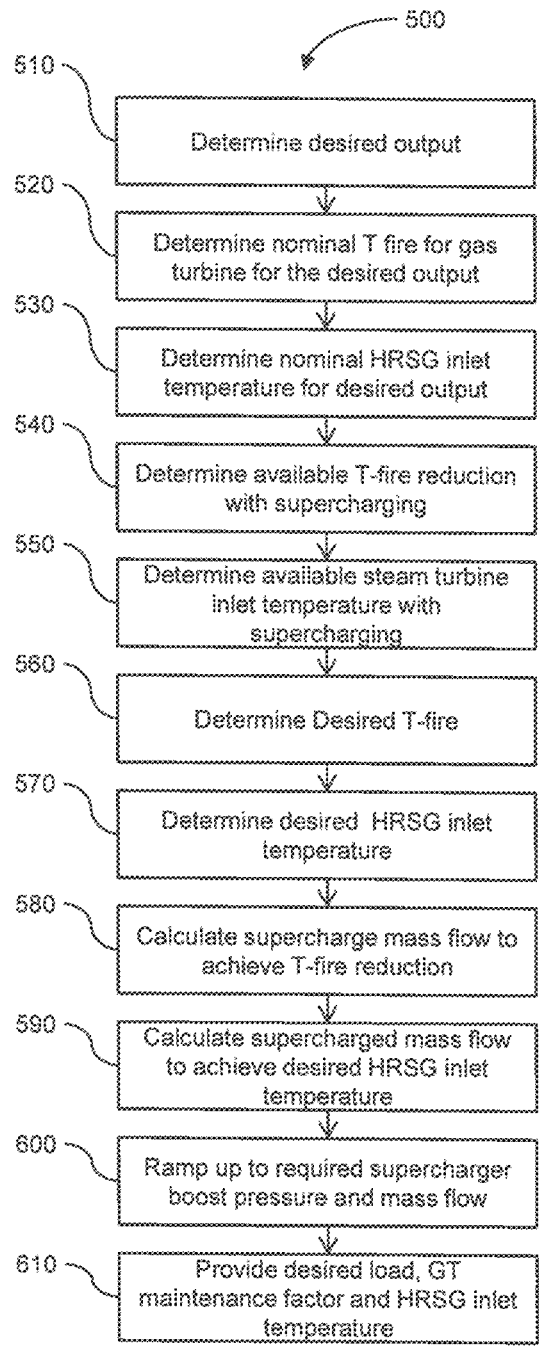
FIG. 25 is a flow chart of a method for operating a combined cycle system having a gas turbine and an HRSG.

Illustrated in FIG. 25 is a flow chart of a method 500 for operating a combined cycle system having a gas turbine and an HRSG.

In step 510, the method 500 determines a desired output.

In step 520, the method 500 determines the nominal T-fire for the desired output.

In step 530, the method 500 determines the nominal HRSG inlet temperature for the desired output.

In step 540, the method 500 determines the T-fire reduction available with supercharging.

In step 550, the method 500 determines the available steam turbine inlet temperature with supercharging.

In step 560, the method 500 determines the desired T-fire.

In step 570, the method 500 determines the desired HRSG inlet temperature.

In step 580, the method 500 calculates the supercharged mass flow required to achieve the reduction in T-fire.

In step 590, the method 500 calculates the supercharged mass flow (second supercharged mass flow provided at a predetermined temperature) that is required to achieve the desired HRSG inlet temperature.

In step 600, the method 500 increases the amount of supercharging to increase the boost pressure and mass flow to the required level.

In step 610, the method 500 provides the desired load, the desired gas turbine maintenance factor and the HRSG inlet temperature.

Figure 26:
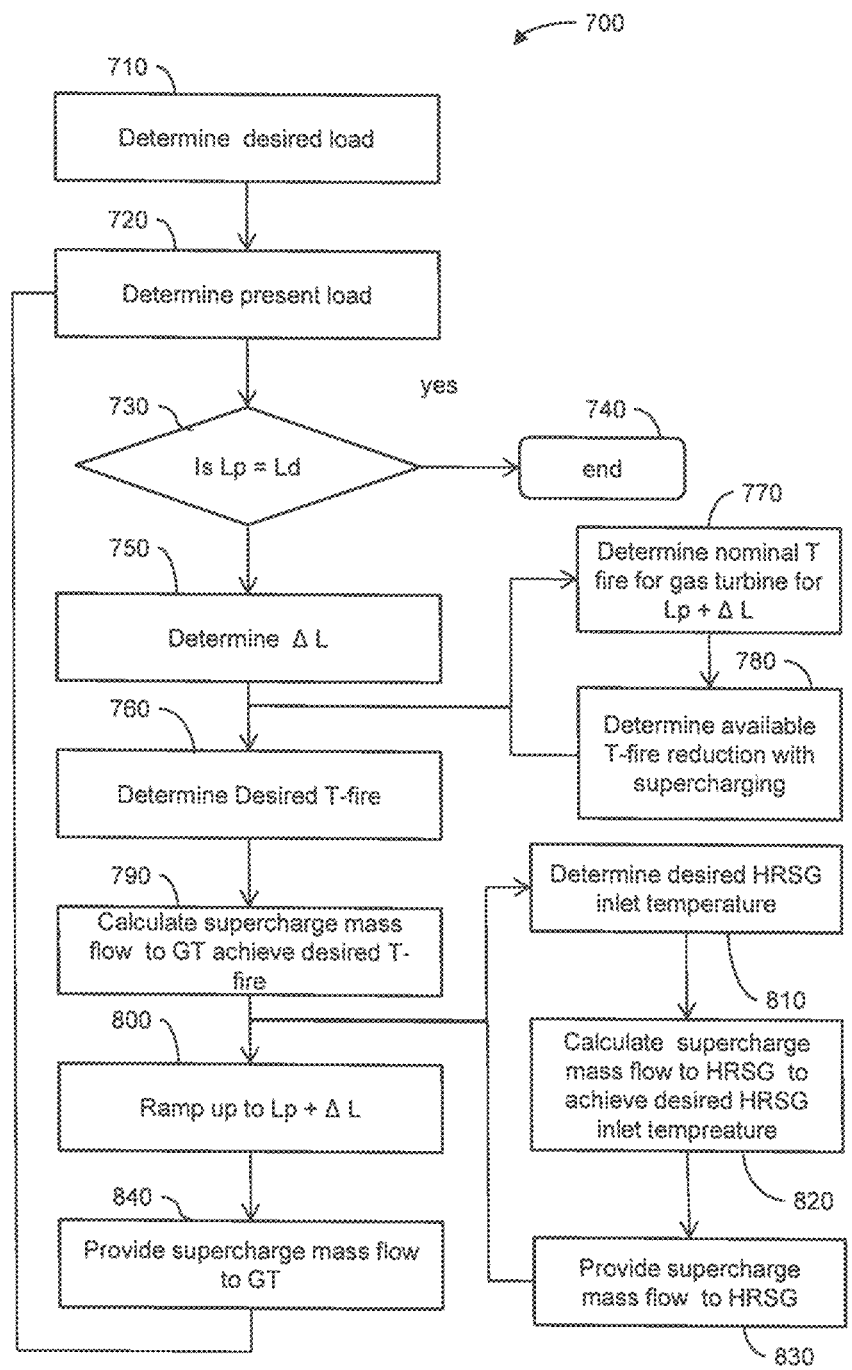
FIG. 26 is a flow chart for a method for ramping up a combined cycle system having a gas turbine and an HRSG.

Illustrated in FIG. 26 is a flow chart for a method 700 for ramping up a combined cycle system having a gas turbine and an HRSG.

In step 710, the method 700 determines the desired load.

In step 720, the method 700 determines the present load.

In step 730, the method 700 determines whether the present load is equal to the desired load. If the present load is equal to desired load the method ends (step 740). If the present load is not equal to the desired load, then the method proceeds to step 750.

In step 750, the method 700 determines an incremental change in load.

In step 760, the method 700 determines a desired T-fire. The desired T-fire may be determined by determining the nominal T-fire of the gas turbine the present load plus the incremental change in the load (step 770).

In step 780, the method 700 may determine the T-fire reduction available with supercharging.

In step 790, the method 700 may calculate the mass flow to be provided by the supercharger to the gas turbine in order to achieve the desired T-fire.

In step 800, the method 700 ramps up the load by the incremental load.

If the system has an HRSG, then the method 700 may determine in step 810 a desired HRSG inlet temperature.

In step 820, the method 700 may calculate the mass flow to be provided by the supercharger to the HRSG to achieve the desired HRSG inlet temperature.

In step 830, the method 700 may provide the HRSG supercharge mass flow (secondary supercharged mass flow, controlled through bypass damper valve 137) to the HRSG.

In step 840, the method 700 may provide the supercharged mass flow to the gas turbine, and repeat step 720 to determine the present load and step 730 to determine if the present load is equal to the desired load.

The foregoing detailed description has set forth various embodiments of the systems and/or methods via the use of block diagrams, flowcharts, and/or examples. Insofar as such block diagrams, flowcharts, and/or examples contain one or more functions and/or operations, it will be understood by those within the art that each function and/or operation within such block diagrams, flowcharts, or examples can be implemented, individually and/or collectively, by a wide range of hardware. It will further be understood that method steps may be presented in a particular order in flowcharts, and/or examples herein, but are not necessarily limited to being performed in the presented order. For example, steps may be performed simultaneously, or in a different order than presented herein, and such variations will be apparent to one of skill in the art in light of this disclosure.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims.

What is claimed:

1. A method for extending hot gas path parts life in a turbine system, the method comprising:
    determining a desired load;
    determining a nominal firing temperature for the desired load;
    determining a supercharged firing temperature for the desired load;
    determining a first mass flow quantity of air to be provided to a compressor in the turbine system to achieve the supercharged firing temperature for the desired load;
    providing an air flow; and
    conveying the first mass flow quantity of air into the compressor,
    the method further comprising:
        determining a desired heat recovery steam generator inlet temperature;
        determining a second mass flow quantity of air to be provided to a heat recovery steam generator to achieve the desired heat recovery steam generator inlet temperature; and
        conveying the second mass flow quantity of air that bypasses the compressor of the turbine to the heat recovery steam generator.

2. The method of claim 1, wherein providing an air flow comprises providing an air flow with a fan.

3. The method of claim 1, wherein conveying the second mass flow quantity of air to the heat recovery steam generator further comprises conveying a second mass flow quantity of air at a predetermined temperature and modulating a heat recovery steam generator inlet temperature.

4. The method of claim 1, further comprising cooling the first mass flow quantity of air.

5. The method of claim 1, wherein conveying the second mass flow quantity of air comprises conveying the second mass flow quantity of air through a bypass to the heat recovery steam generator.

6. The method of claim 5, further comprising controlling the second mass flow quantity of air with a valve coupled to the bypass.

7. A method for extending hot gas path parts life in a turbine system comprising:
    determining a desired load;
    determining a desired maintenance factor;
    determining an amount of supercharging required to achieve the desired maintenance factor for the desired load;
    determining a first mass flow quantity of air to be provided to a compressor to achieve the amount of supercharging;
    determining a second mass flow quantity of air to be provided to a heat recovery steam generator;
    providing an air flow;
    conveying the first mass flow quantity of air into the compressor; and
    conveying the second mass flow quantity of air that bypasses the compressor to the heat recovery steam generator.

8. The method of claim 7, wherein providing an air flow comprises providing an air flow with a fan.

9. The method of claim 7, further comprising:
    determining a desired heat recovery steam generator inlet temperature;
    and wherein determining a second mass flow quantity of air to be provided to a heat recovery steam generator comprises determining a second mass flow quantity of air to be provided to a heat recovery steam generator to achieve the desired heat recovery steam generator inlet temperature.

10. The method of claim 9 wherein conveying the second mass flow quantity of air to the heat recovery steam generator further comprises conveying a second mass flow quantity of air at a predetermined temperature and modulating a heat recovery steam generator inlet temperature.

11. The method of claim 7 wherein conveying the second mass flow quantity of air comprises conveying the second mass flow quantity of air through a bypass to the heat recovery steam generator.

12. The method of claim 11 further comprising controlling the second mass flow quantity of air with a valve coupled to the bypass.

13. A method for ramping up a combined cycle system having a gas turbine and a heat recovery steam generator, comprising:
    determining a desired load;
    determining a present load;
    determining whether the desired load is greater than the present load;
    determining an incremental load increase;
    determining a desired firing temperature for the present load plus the incremental load increase;

calculating a first supercharged mass flow to the gas turbine to achieve the desired firing temperature for the present load plus the incremental load increase;

increasing the present load to the present load plus the incremental load increase; and providing the first supercharged mass flow to the gas turbine, further comprising:

determining a desired heat recovery steam generator inlet temperature for the present load plus the incremental load increase;

calculating a second supercharged mass flow to a heat recovery steam generator to achieve the desired heat recovery steam generator inlet temperature for the present load plus the incremental load increase; and providing the second supercharged mass flow that bypasses the gas turbine to the heat recovery steam generator.

14. The method of claim 13, wherein providing the first supercharged mass flow to the gas turbine comprises providing the first supercharged mass flow to the gas turbine with a fan.

15. The method of claim 13, wherein providing the second supercharged mass flow to the heat recovery steam generator comprises providing the second supercharged mass flow into the heat recovery steam generator through a bypass.

16. The method of claim 13, wherein providing the second supercharged mass flow to the heat recovery steam generator comprises controlling the second supercharged mass flow with a valve.

17. The method of claim 13, wherein the desired load is a peak load.

18. The method of claim 14, wherein providing the first supercharged mass flow to the gas turbine with a fan comprises driving the fan with a prime mover.

* * * * *